Patented Dec. 29, 1942

2,306,440

UNITED STATES PATENT OFFICE 2,306,440

DISSOLVING, SOFTENING, GELATINIZING, AND SWELLING AGENTS

Winfrid Hentrich, Rodleben, near Dessau-Rosslau, Anhalt, Erik Schirm, Dessau in Anhalt, and Rudolf Endres, Dessau-Rosslau, Anhalt, Germany, assignors, by mesne assignments, to "Patchem A.-G. zur Beteiligung an Patenten und Sonstigen Erfindungsrechten auf Chemische Verfahren", Zurich, Switzerland, a corporation of Switzerland No Drawing. Application April 13, 1939, Serial No. 267,622. In Germany April 14, 1938

13 Claims. (Cl. 106—176)

This invention relates to dissolving, softening, gelatinizing, and swelling agents, which agents are generally designated as plasticizing agents. More particularly it relates to compounds containing at least one —C(OR)=N— groups, where R is a hydrocarbon radical, which products are especially effective as dissolving, softening, gelatinizing, and swelling agents.

An object of the present invention is to provide a series of such agents which are suitable for use in the production of coating composition, insulating media, and plastic masses.

In accordance with the invention, heterocyclic compounds containing at least one —C(OR)=N— group, wherein R represents any desired acyclic or cyclic hydrocarbon group, are used advantageously as dissolving, softening, gelatinizing and swelling agents, especially as modifying agents with cellulose derivatives, natural and synthetic resins, synthetic polymerization products, natural and artificial caoutchouc, and the like. The hydrocarbon groups of these heterocyclic compounds may be alkyl radicals or may contain hetero-atoms, such as oxygen, sulfur, nitrogen, or halogen, or may contain known oxygen-, sulfur-, and nitrogen-containing hetero-atomic groups, such as hydroxyl, ketone, amino, ester, acid amide and like groups.

Among the broad class of compounds useful for the purpose of the invention and having at least one —C(OR)=N— group are derivatives of such groups as the oxazols, the thiazols, the imidazols and the like, especially their benzo-compounds, the pyridines and their benzo-compounds, and the di- and tri-azines.

These dissolving, softening, gelatinizing and swelling agents may be produced by the conversion of the corresponding halogen compounds, that is, compounds having one or more —C(Hal)=N— groups, with acyclic and cyclic alcoholates, whereby the corresponding metal halide is formed and the halogen atoms are replaced by the alcohol group. In accordance with another practice suitable salts, for instance, salts of cyanuric acid are reacted with hydrohalic acid esters of acyclic and cyclic alcohols, thereby forming esters having the required structure. In accordance with still another practice, lower molecular alcohol esters, such as those of cyanuric acid, are esterified with suitable higher molecular alcohols thereby forming higher molecular esters.

In accordance with the invention it has been found that the esters of cyanuric acid provide a preferred class of dissolving, softening, gelatinizing and swelling agents. Such cyanuric acid esters are: the di- and tri-methyl esters, the di- and tri-butyl esters, the tri-amyl ester, the tri-hexyl ester, mixtures of these esters and their homologues; the di- and tri-dodecyl esters, the tri-oleyl ester, the tri-cyclohexyl ester, the tri-alkyl cyclohexyl esters, the di- and tri-naphthenyl esters, the di- and tri-benzyl esters, the tri-phenyl ester, the tri-naphthyl ester, the tri-alkyl phenyl esters, the tri-alkyl naphthyl esters, the di- and tri-1,2-propylene glycol esters, the di- and tri-glycol esters, the glycerine ester, the polyglycol ester, the polyglycerine ester, the di- and tri-sorbitol esters, the di- and tri-mannitol esters, the di- and tri-dulcitol esters, the tri-tetrahydrofurfuryl ester and like esters with other ether alcohols.

In accordance with another embodiment of the invention, diazine derivatives are employed for the purposes herein disclosed. Such compounds are, for instance, 2,4-dimethoxy quinazoline, 2,4-di-ethoxy quinazoline, 2,4-di-butoxy quinazoline, 2,4-di-dodecoxy quinazoline, 2,4-di-butoxy 6-methyl pyrimidine, 2,3-di-butoxy quinoxaline and the like.

In accordance with still another embodiment of the invention, heterocyclic compounds are employed for the purposes of the invention, which contain only one —C(OR)=N— group. Such compounds comprise, for instance, 2-ethoxy benzoxazol, 2-butoxy benzoxazol, 2-phenoxy benzoxazol, 2-dodecoxy thiazol, 2-butoxy benzthiazol, 2-dodecoxy benzthiazol, 2-ethoxy benzimidazol, α-octyloxy pyridine, α-dodecoxy pyridine and the like.

The heterocyclic compounds of the invention are generally suitable as agents for dissolving, softening, gelatinizing, and swelling but they are especially useful with cellulosic compositions, natural and synthetic resins, natural and synthetic rubber and with polymerization products in general. They form suitable dissolving, softening, gelatinizing and swelling agents for cellulose esters and ethers such as nitro-cellulose, low molecular fatty acid esters of cellulose, such as acetyl cellulose and the like, as well as for ethyl and benzyl cellulose and the like; likewise for natural and synthetic resins and waxes and polymerization products, such as copals, colophony, phthalic acid glycerine ester resins, phenol-formaldehyde resins, aniline formaldehyde resins, urea formaldehyde resins, condensation resins derived from di- and tri-azines, polyvinyl resins, polystyrol resins, cumaron resins, shellac, montan wax, chlorinated naphthalene and the like; also for synthetic and natural caoutchouc, gutta-percha, balata, pitch, asphalt and the like, all of which are organic plastic materials.

The agents of this invention have the desirable property of being compatible with other materials which are customarily used in connection with cellulose derivatives and the other natural and synthetic products just mentioned in the production of various articles of manufacture, such as films, sheets, plates, threads, ribbons, tubes, coatings, plastic masses and the like. For instance, they are compatible with mineral, vegetable and animal oils as well as with other softeners. These and other desirable properties of the condensation products of the invention make them useful in the production of commercial fabricated products of various kinds, such as adhesives, putty, impregnation agents, fillers, synthetic products, plastics and the like.

The following examples illustrate the products, processes and uses of the products included within the invention, but they are not to be interpreted as limitations upon the scope of the invention.

*Example 1*

A solution of 18.4 parts by weight of cyanuric chloride in 100 parts by volume of toluol is introduced gradually into a solution of 6.9 parts by weight of sodium in 150 parts by volume of butanol during cooling and stirring. After stirring for a considerable period of time, the reaction is completed, the solution containing n-tri-butyl ester of cyanuric acid. The ester is washed and dried, whereupon butanol and toluol is distilled off and the residue distilled in a vacuum. The ester, distilled off at a temperature of 206° to 213° C., is an achromatic, almost scentless liquid.

Thirty three parts by weight of nitro-cellulose of low viscosity produced by dissolving the same in alcohol in a ratio of about two parts of alcohol to one part of nitro-cellulose, 3.5 parts by weight of ricinus oil, 7.0 parts by weight of the aforesaid cyanuric acid ester, 2.5 parts by weight of butanol, 16.0 parts by weight of 85% butyl-acetate are combined and stirred until the nitrocellulose is completely dissolved. Then 20 parts by weight of toluol and 7 parts by weight of xylol having dissolved therein 11 parts by weight of a resin ester are stirred into the resulting solution. A lacquer is obtained which is suitable for covering metals and wood, yielding a hard elastic coating.

*Example 2*

Twenty seven and nine-tenths parts by weight of n-dodecyl alcohol and 150 parts by volume of xylol are added to a solution of 3.45 parts by weight of sodium in 75 parts by volume of absolute alcohol. The mass is heated and the alcohol distilled off until the temperature of the vapors being distilled has reached the boiling point of the xylol. Then the resulting solution is cooled to 5° C. and a solution of 9.2 parts by weight of cyanuric chloride in 50 parts by volume of xylol is gradually introduced producing thereby a clear solution. The solution containing n-tri-dodecyl ester of cyanuric acid is worked up as in Example 1 with the exception that the ester separates out as a yellowish oil which gradually crystallizes.

Twenty-one parts by weight of nitro-cellulose of low viscosity produced by dissolving the same in alcohol in a ratio of about two parts of alcohol to one part of nitro-cellulose are dissolved in a solvent-mixture of 33 parts by weight of 100% butyl acetate, 5 parts by weight of butanol and 28 parts by weight of xylol. Then 8 parts by weight of the aforesaid cyanuric acid ester having 5 parts by weight of dewaxed damar resin dissolved in it are added to the nitro-cellulose solution. A lacquer is obtained which is suitable for producing coatings of high elasticity and of good water-resistant properties.

*Example 3*

Twenty parts by weight of a vinyl polymerization product are dissolved in 40 parts by weight of acetone and 40 parts by weight of xylol. Then 10 parts by weight of cyanuric acid tri-butyl ester are added and the mixture is thoroughly stirred. A lacquer is produced which, when brushed on any desired body, leaves upon drying a clear, very elastic film. If it is desirable, the proportion of the vinyl polymerization product may be increased thereby producing a mass having valuable thermoplastic and insulating properties.

*Example 4*

Twenty parts by weight of polystyrol are dissolved in 60 parts of toluol, and next, 10 parts by weight of cyanuric acid tri-butyl ester are added. A clear lacquer is formed which may be used for coverings of various kinds. When the coated materials are dried at a temperature of about 120° C., a hard elastic coating is produced. An equal quantity of 2-butoxy benzthiazol may advantageously be used in place of the cyanuric acid tri-butyl ester.

It should be understood that the present invention is not limited to the specific processes, compounds, and compositions herein disclosed but that it extends to all equivalent compounds, compositions, and processes which one skilled in the art would consider within the scope of the appended claims.

We claim:

1. A plastic material comprising, as a base material a film-forming vinyl polymerization product, and as a dissolving, softening and gelatinizing agent tri-alkyl ester of cyanuric acid.

2. As a new compound a tri-alkyl ester of cyanuric acid having at least one alkyl residue with at least 8 carbon atoms.

3. As a new compound the tri-octyl ester of cyanuric acid.

4. As a new compound the tri-dodecyl ester of cyanuric acid.

5. As a new compound the tri-oleyl ester of the cyanuric acid.

6. A plastic mass having nitro-cellulose as a base material and a trialiphatic ester of cyanuric acid as a dissolving, softening, gelatinizing and swelling agent, said ester group containing at least 4 carbon atoms.

7. A plastic mass having as an organic thermoplastic plastic base material a substance selected from the group consisting of cellulose esters, cellulose ethers, and resins, and as a plasticizing agent for said base material the commercial mixture comprising the trialkyl esters of cyanuric acid derived from aliphatic alcohols having at least 4 carbon atoms in the molecule.

8. A plastic mass having as an organic thermoplastic base material, a substance selected from the group consisting of cellulose esters, cellulose ethers, and resins, and as a plasticizing agent for said base material a heterocyclic compound having at least one —C(OR)=N— group in its heterocyclic ring, in which R is a hydrocarbon radical.

9. A coating composition containing a cellulose ester as a plastic base material and a tri-alkyl ester of cyanuric acid as a plasticizing agent.

10. A plastic material comprising a film-forming thermoplastic synthetic resin as a base material and a heterocyclic compound having at least one —C(OR)=N— group in its heterocyclic ring, in which R is an aliphatic hydrocarbon radical of at least 4 carbon atoms, as a plasticizing agent.

11. A coating composition containing cellulose nitrate, damar resin and tri-dodecyl ester of cyanuric acid as a plasticizing agent.

12. A plastic coating composition containing a polystyrol resin as a film-forming base material and a tri-alkyl ester of cyanuric acid as a plasticizing agent.

13. A plastic mass having as an organic thermoplastic plastic base material a film-forming substance selected from the group consisting of cellulose ester, cellulose ethers and resins, and as a plasticizing agent for said base material a tri-alkyl ester of cyanuric acid.

WINFRID HENTRICH.
ERIK SCHIRM.
RUDOLF ENDRES.